Aug. 25, 1959
J. R. POOLE
2,901,170
SHAFT POSITION INDICATOR
Filed Aug. 24, 1953
2 Sheets-Sheet 1
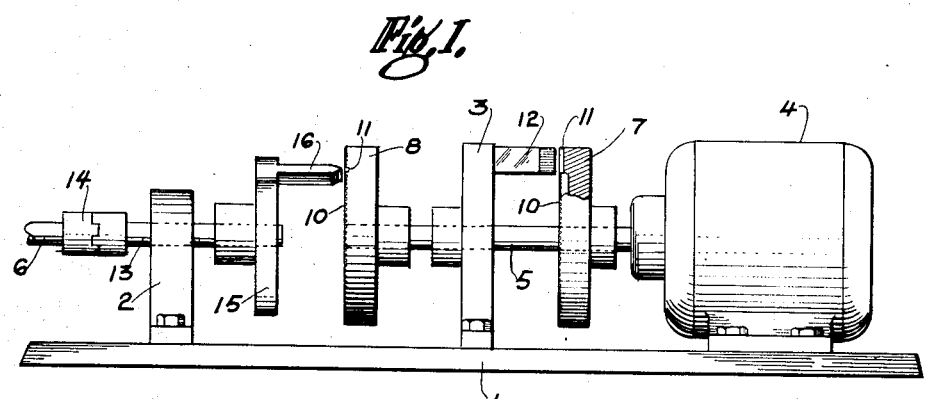
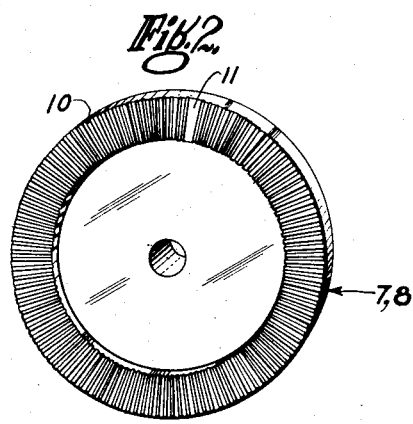
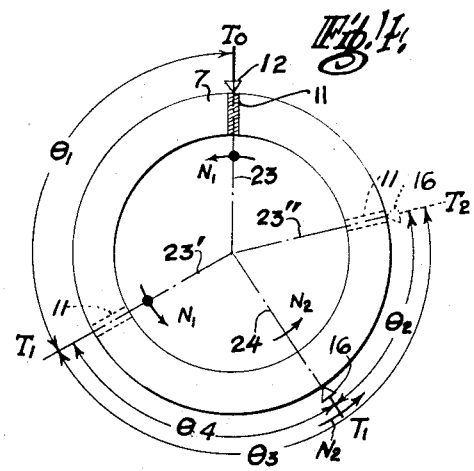
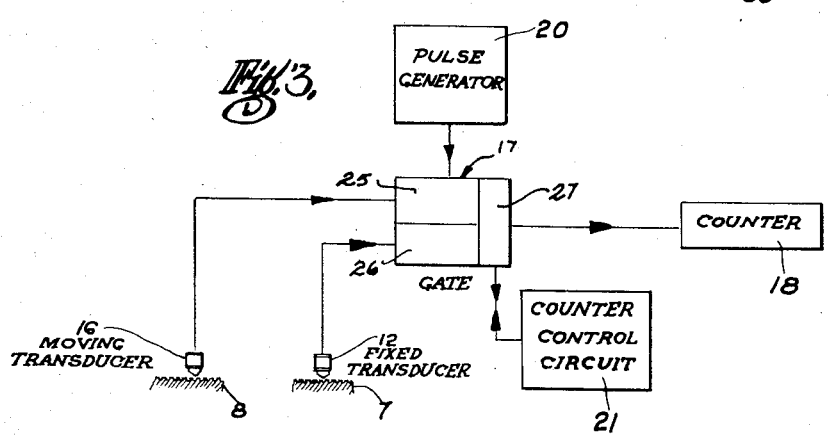
INVENTOR
Joseph R. Poole
BY
Pennie, Edmonds, Morton, Barrows & Taylor
ATTORNEY Aug. 25, 1959 — J. R. POOLE — 2,901,170
SHAFT POSITION INDICATOR
Filed Aug. 24, 1953 — 2 Sheets-Sheet 2

INVENTOR
Joseph R. Poole
BY
ATTORNEYS

United States Patent Office 2,901,170
Patented Aug. 25, 1959

2,901,170

SHAFT POSITION INDICATOR

Joseph R. Poole, Summit, N.J., assignor to The Austin Company, New York, N.Y., a corporation of Ohio Application August 24, 1953, Serial No. 375,878

8 Claims. (Cl. 235—92)

This invention relates to the determination of the position of moving machine elements and more particularly to a method and an apparatus for determining the instantaneous angular displacement of a shaft rotating about its axis.

It has become common to present a wide variety of quantitative data in terms of the angular positions with respect to time of rotating shafts. A concrete example is that of electro-mechanical, or analogue, computers in which the instantaneous value of a variable or function of a variable is represented by the instantaneous angular displacement of a rotating shaft with respect to a given reference. Over a sufficiently broad range of a function of a variable the output shaft of an analogue computer may reverse its direction of rotation, its angular velocity may vary rapidly, and the shaft may remain motionless for significant periods if the function assumes a constant value. In any of these cases, the problem is always to express the shaft position at successive instants in time in meaningful terms which may be used in further computations and applications. A common illustration is the conversion of data in analogue form to digital form to permit further computation by computing machines adapted to utilize discrete values of a function of a variable.

I have invented a method and an apparatus according to the invention to practice the method for determining the instantaneous angular displacement of a rotating shaft with respect to a fixed reference.

My novel method includes the step of determining the angular displacement of a rotating reference radius from a fixed fiducial radius at the instant that the angular position of the rotating shaft or other member is to be determined. Then I determine the angular displacement of a base radius on the rotating member from the reference radius at the instant the position of the rotating member is to be determined. This latter displacement is added to the displacement previously found and the sum of the displacement is equal to the angular displacement of the base radius on the rotating member with respect to the fiducial radius.

Apparatus for practicing the method of the invention utilizes means for generating a first train of distinct signals. The number of signals in this first train is related to the angular displacement during a first interval of time of a rotating reference member from a fixed fiducial radius. The first interval of time immediately precedes the instant at which the angular displacement of the rotating member is to be determined. I provide means for counting the signals generated and this means serves to retain in a "memory" the number of signals generated in the first time interval. Another means is utilized to generate a second train of distinct signals, the number of signals in the second train being related to the difference between the angular displacement of the reference member during a second interval of time continuous of said first interval and the angular displacement of the rotating member during the second interval. The number of signals in the second train is also counted by the means provided and added to the number of signals in the first train. The sum of the numbers of signals generated in the first and second intervals is related to the instantaneous angular displacement of the base radius on the rotating member with respect to the fiducial radius.

For a complete understanding of my invention attention is directed to the following description and the accompanying drawings in which:

Fig. 1 is a side elevation of a shaft position indicator according to the invention.

Fig. 2 is a plan view of a signal generating disc to be utilized in the indicator of Fig. 1.

Fig. 3 is a diagram illustrating the steps of the method and the operation of the position indicator of Fig. 1.

Fig. 4 is a diagram illustrating the method of the invention and of the operation of the indicator of Fig. 3.

Figure 5:
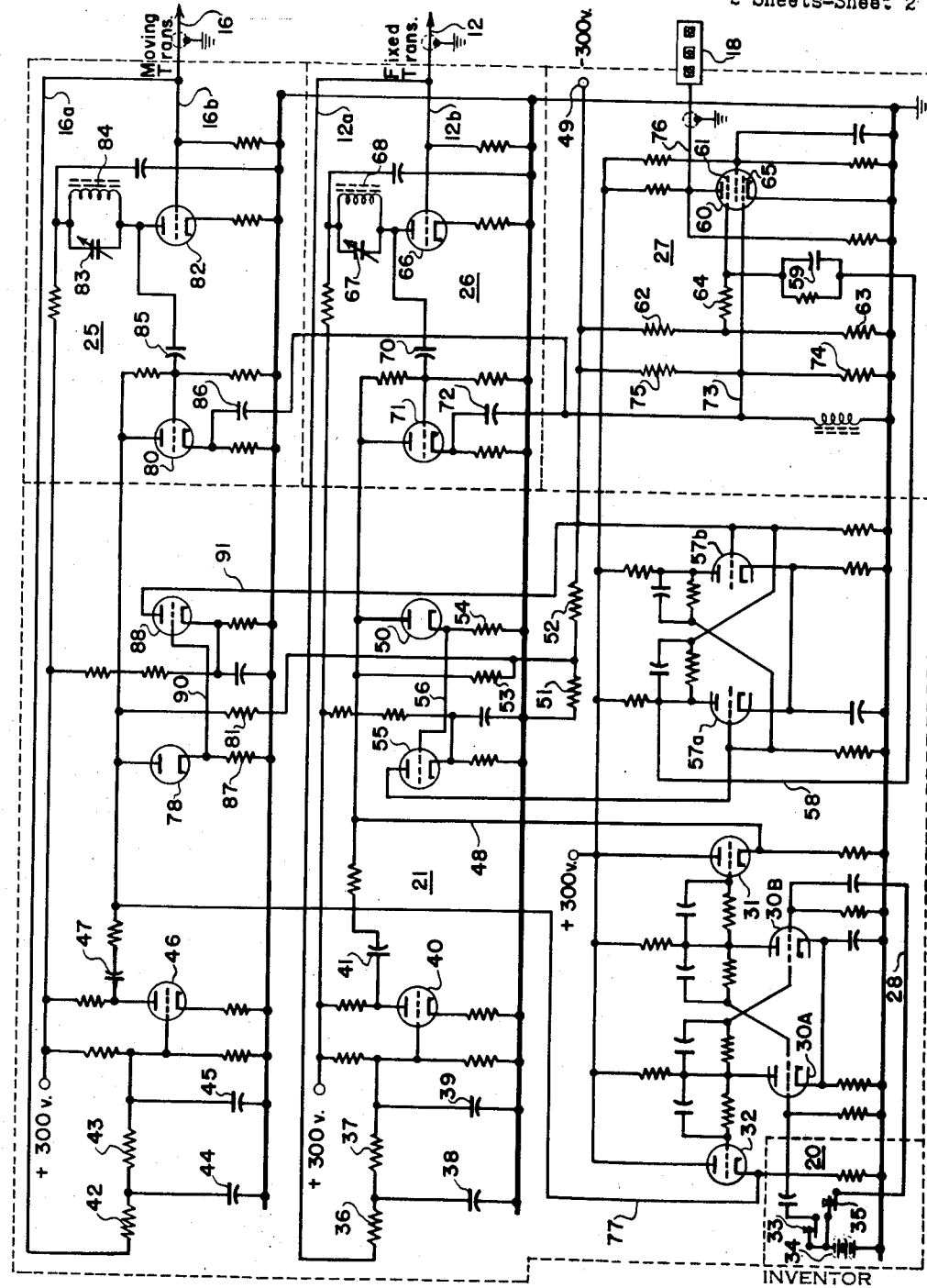
Fig. 5 is a schematic representation of the circuits indicated diagrammatically in Fig. 3.

Referring now to Fig. 1, apparatus according to my invention and adapted to function according to the method of my invention comprises base 1 which supports bearing posts 2 and 3 and a motor 4. Shaft 5, journaled in bearing post 3, is driven by motor 4 at a substantially constant angular speed greater than the angular speed of the shaft 6 under observation. Fixed to shaft 5 for rotation therewith are two reference members in the form of metallic discs 7 and 8. As illustrated in Fig. 2, each of these discs has engraved on a face thereof an annular band of radially disposed, spaced lands 10. In the form of the apparatus now being described the number of lands on the face of each disc is identical and their spacing is identical. Thus, the angular separation between a point on a land and the corresponding point on an adjacent land represents a unit of angular measure about the axis of the discs.

At identical angular positions on the engraved faces of the discs, there are discontinuities 11 in the successions of lands. These discontinuities are preferably wide grooves, each of which may conveniently be made merely by removing one land. Thus, if I divide the annular band on the face of a disc into 500 parts, there will be 499 lands of equal width and a wide groove. This discontinuity or groove serves to mark the position of a reference radius on the discs.

Fixed adjacent to the band of lands on the face of the disc 7, I provide a first magnetic transducer 12 designed to produce a first train of distinct signals in the form of a pulsating output voltage as the lands on the disc 7 pass the transducer. The frequency of this first output voltage is determined by the rate at which the lands pass the transducer and will be substantially constant except at the instant the wide groove 11 passes the transducer. Then there will be an abrupt change in the frequency of the transducer output voltage, the purpose of which is explained below.

Journaled in the bearing post 2 is a shaft 13 adapted to be coupled mechanically or otherwise to the rotating shaft 6 under observation, the instantaneous angular position of which is to be determined. The end of the shaft 13 opposite the coupling 14 carries a crosshead 15. Fixed to this crosshead for revolution about the common axis of shaft 13 and disc 8 is a moving second magnetic transducer 16 adapted to produce a second train of distinct signals in the form of a pulsating output voltage in the same manner as does the fixed transducer. However, the frequency of the output voltage of this second transducer 16 may generally be lower or higher than the frequency of the output voltage of the first transducer 12. This follows inasmuch as the relative velocity of the disc 8 with respect to the moving transducer 16 may be lower or higher than the velocity of the disc 7 with respect to the fixed transducer 12, depending on the direction of rotation of the shaft 6 with respect to disc 8 and, therefore, the lands on disc 8 will pass the moving transducer at a lower or higher rate than the rate at which the lands on the disc 7 pass the fixed transducer.

The connection to the fixed head 12 is a direct wire connection. If, in a particular embodiment, the shaft 6 does not make substantially more than one revolution in either direction, but simply oscillates, the connection to the moving transducer 16 may also be a direct connection through a short, flexible coil of wire. In an embodiment in which the shaft 6 rotates in one direction or the other through a large number of revolutions a suitable slip ring mounted on the shaft and connected to the pickup and stationary brush having an external connection to the gate terminal may be used to collect the signals from the moving transducer.

The purpose of the apparatus described above is to make continuously available first and second trains of distinct signals. The first of these trains of signals is related to the angular displacement of the reference lands or marks on the reference discs with respect to the fixed transducer while the second train of signals is related to the angular displacement of the moving transducer with respect to the reference discs. It will be readily apparent that any other apparatus capable of generating like trains of signals may be used, e.g. rotating discs having alternate transparent and opaque radial lines and utilized to interrupt beams of light impinging on photoelectric cells.

Referring now to Fig. 3 here follows a brief résumé of apparatus to be used in connection with my invention to form an operative shaft position indicator. The pulsating output voltages of the fixed and moving transducers are connected to separate inputs of an electronic switch or gate 17. This gate is actuated by a transfer pulse from an external source to cause the gate to disconnect the fixed transducer and connect the moving transducer to the output of the gate at the instance the angular position of shaft 6 is to be determined. The output of the gate is in turn connected to a counter 18 adapted to advance one unit for each voltage pulse corresponding to a land on a disc. While the transfer pulse for actuating the gate 17 may be derived from any suitable manually or automatically operated device, in this preferred embodiment I utilize a timed pulse generator 20 which continuously delivers transfer pulses at predetermined intervals.

The output of the gate, which is either the pulsating voltage of the fixed transducer or that of the moving transducer, is connected to a counter 18 adapted to advance one unit for each pulse corresponding to a land on a disc. A suitable counter for the purpose is shown in Fig. 17.8 at page 611 of Chance et al.: "Waveforms" of the MIT Radiation Laboratory Series published by McGraw-Hill (1949). This counter is started and stopped by a control circuit 21 which is sensitive to the marked variations in the frequency of the output voltage of the transducer which occur at the instant one of the wide grooves passes a transducer as pointed out above. For this circuit I preferably utilize a multivibrator having a critical response frequency somewhat below the normal frequency of the output voltages of the transducers. Then, when a wide groove or discontinuity in the succession of lands passes a transducer there is set up a discontinuity in the output voltage, which discontinuity is a complex wave form with a frequency appreciably lower than the frequency generated by the evenly spaced lands. This discontinuity causes the multivibrator to produce a large amplitude pulse available for control purposes. The output pulse of the multivibrator initiated by the wide groove in disc 7 passing the fixed transducer 12 will always occur at precisely the same angular position of the reference discs and may be used to initiate counting of pulses from the fixed transducer. The similar pulse initiated by the wide groove in disc 8 passing the moving transducer 16 may occur at any angular position of the reference discs and is used to interrupt counting of pulses from the moving transducer.

In Fig. 5 there is shown particular circuitry suitable for use in the shaft position indicator of my invention. It is to be understood that the circuitry shown here is merely for purposes of illustration and is not to be taken as a limitation of the scope of the invention. The various portions of the circuit in Fig. 5 correspond to the portions of the block diagram of Fig. 3 in the following manner. The counter control circuit 21 comprises the components within the dotted boundary forming the box to the left of the drawing in Fig. 5. In the lower left hand corner of this box there are also indicated the components comprising the pulse generator 20 of Fig. 3. The sections of the "gate" 17 in Fig. 3 are representative of the groups of components shown in Fig. 5 as follows: the subdivision 25 represents the uppermost horizontal box in dotted outline in Fig. 5; the lower horizontal box 26 of the gate 17 represents the middle horizontal box in dotted outline of Fig. 5; and the vertical box 27 of the gate 17 in Fig. 3 is representative of the components within the lowermost horizontal box 27 of Fig. 5. The counter indicated at 18 in Fig. 3 is likewise indicated at 18 in Fig. 5.

In Fig. 5 there are indicated input connections 12a and 16a to the counter control circuit 21 from the fixed transducer 12 and the moving transducer 16 respectively. There is also indicated an input connection 12b from the fixed transducer 12 to the section 26 of the gate 17 and an input connection 16b from the moving transducer 16 to the section 25.

In the pulse generator 20 there is provided a key 35 and battery 34 by which a preset pulse is impressed on the counter control circuit 21 to prepare the indicator to take a reading of the shaft position. In the lowermost part of the counter control circuit 21 there is indicated a well known type of bistable multivibrator switching device comprising the triode vacuum tubes 30a and 30b and their attendant circuit components. This is a conventional circuit, sometimes known as a "flip-flop," and therefore a complete description of each of its components and their functions is not necessary. It is sufficient to say that when one triode, e.g. 30a, is conductive the other triode 30b is non-conductive and vice versa, and that the conductivity or non-conductivity of the triode sections 30a and 30b can be controlled by pulses of appropriate polarity on the grids thereof.

The aforementioned preset pulse impressed on the grid of the triode 30b establishes the required stable condition of the flip-flop and causes that tube to become nonconductive and the triode 30a to become conductive. So long as the tube 30b is non-conductive a more positive voltage is impressed on the grid of the triode 31 which is arranged as a cathode follower. A similar triode 32, operating in conjunction with the triode 30a, is also arranged as a cathode follower. The other of the two stable conditions of the flip-flop 30 is controlled by transfer pulse from the generator 20 which as previously explained may be any suitable device for impressing pulses on the grid of triode 30a from the battery 34. To simplify the description of the operation of this embodiment of my device, I merely show here a key switch 33.

It is understood, of course, that where it is desired to make continuous series of readings of the shaft position both the preset pulse and the transfer pulse may be supplied from suitably timed mechanical or electronic pulse generators.

The relation of this flip-flop to the other sections of the circuit is explained in detail below.

On the input connection 12a from the fixed transducer 12 there is a signal comprised of the relatively high frequency periodically varying signal due to the lands 10 on disc 7 passing the transducer 12 and, once in each revolution of disc 7, the somewhat lower frequency pulse due to the discontinuity 11 passing the transducer. This composite signal is impressed on the time constant network comprising the resistances 36 and 37 and the capacitances 38 and 39 which is tuned to a somewhat lower frequency than that of the pulses continuously delivered from the fixed head 12 so that the effective signal passing through the network to the grid of the triode amplifier 40 is essentially the single pulse due to the discontinuity 11 in the disc 7 passing the fixed transducer 12. This tuning of the circuit thus makes available at the output of the amplifier tube 40 a single control pulse which is applied through the capacitance 41 to following elements of the circuit.

The input connection 16a also receives from the moving transducer 16 a similar composite signal which is likewise impressed on a time constant network comprising the resistances 42 and 43 and the capacitances 44 and 45. The values of these components are also selected to pass the signal pulse due to the discontinuity 11 in the disc 8 passing the moving transducer 16. The single pulse passed by this network is impressed on the grid of the amplifier tube 46, thus making available at the output of the amplifier tube 46 a second control pulse to be impressed on the following elements of the circuit through the coupling capacitance 47.

The control pulses from the amplifiers 40 and 46 are used to turn on and off, i.e. render conductive or non-conductive, respectively, the gate tube 60 in the section 27 of the gate 17. This is accomplished in the following manner.

Consider first that a preset pulse has been impressed upon the grid of triode 30b rendering it non-conductive and the triode 30a conductive. Then there is an increased voltage from the plate of triode 30b impressed on the grid of the cathode follower 31 causing the latter to become more conductive. In this state the cathode of the cathode follower 31 increases its potential relative to ground, which increased potential is applied through the connection 48 to the plate of diode 50. In the absence of this increased potential the plate of diode 50 is normally held at a potential below ground level by virtue of the voltage divider circuit comprising the resistances 51 and 52 and the resistance 53 connecting the plate of tube 50 to the —300 volt power supply terminal 49. The effect of the signal coming in to the plate of diode 50 through the connection 48 is to raise the plate potential of the diode to the threshold of conductivity. Now, when the control pulse from the output of the triode 40 is also put on the plate of the diode 50 through capacitance 41, the diode 50 becomes conductive and a voltage appears across the cathode resistance 54 thereof. This voltage is impressed on the grid of isolation amplifier 55 through the connection 56 and this amplifier becomes conductive. The consequent change in plate voltage of amplifier 55 is utilized to change the grid bias on the triode section 57a of a bistable multivibrator 57 or "flip-flop" switching device. This change in bias being relatively negative cuts off the tube 57a thus allowing the plate voltage thereof to rise to the +300 volt level of the plate supply terminal. This increased plate voltage is applied through the conductor 58 and the R-C network 59 to the outer grid 61 of an output gate tube 60 in section 27. It is seen that this grid is normally supplied with a high negative bias from the —300 volt terminal of the power supply through the voltage dividing network comprising the resistances 62, 63 and 64. Of course, with this high negative bias the tube 60 is non-conductive; however, when the large positive voltage from the plate circuit of triode section 57a of the multivibrator is applied the effect is to cause the gate tube 60 to become unblocked which enables the tube 60 to pass signals applied to the inner grid 65 to the counter 18 as will now be described.

The first such signals to be counted are the pulses set up in the fixed transducer 12 by the lands 10 on the disc 7. As is readily apparent the frequency of these pulses will be determined by the number of lands in the band around the periphery of the disc 7 multiplied by the rate of rotation of the disc as determined by the speed of the motor 4. The output of the fixed transducer is also connected to the input connection 12b in Fig. 5 as previously explained. As shown, the input 12b from the fixed transducer is connected to the grid of tuned plate amplifier tube 66 in the section 26 of gate 17. The tube 66 operates in conjunction with the tank circuit comprising the condenser 67 and inductance 68 as a so-called ringing circuit which supplies a continuous, relatively pure sine wave output at the plate of tube 66, the frequency of the wave being identical with the frequency of the pulses induced in the transducer 12. This sine wave is impressed through the coupling capacitor 70 on the grid of gate tube 71 and as the tank circuit 68 is tuned to the same frequency as that of the incoming pulses at the connection 12b there is continuously available at the grid of tube 71 an alternating signal having the same frequency as that of the pulses generated by the band of lands on disc 7 passing the fixed transducer 12.

By the same means which render the diode 50 conductive or non-conductive, the cathode follower 71 used as a gate tube is simultaneously rendered conductive or non-conductive since the plate of the latter tube is supplied with an energizing potential from the same source as the plate of the diode 50. Therefore, when the diode 50 passes a pulse which ultimately unblocks the output gate tube 60 there appears in the plate cathode circuit of tube 71 a voltage pulse train having the same frequency as that of the sine wave voltage impressed on the grid of this tube. This varying voltage is taken off the cathode of tube 71 through the coupling condenser 72 and impressed on the control grid 65 of output gate tube 60 through the connection 73. It will be understood that the resistances 74 and 75 constitute a voltage dividing network which supplies a bias voltage to the grid 65.

The pulsating voltage on the grid 65 causes a corresponding voltage of the same frequency in the plate circuit of the tube 60, which voltage is impressed through the connection 76 on the counter 18. Thus, the counter begins to register one unit for each positive pulse of output voltage of tube 60. As a positive pulse of this output voltage corresponds in all respects to the sensing of a land by the fixed transducer, one unit registered on the counter 18 corresponds to one unit of angular measure represented by a land on the disc 7. As previously explained in the more generalized discussion in connection with Fig. 3 the counter will continue to register these pulses representative of units of angular measure until the instant that it is desired to determine the angular position of the shaft 6 under observation.

At that instant, the transfer pulse key 33 of the pulse generator 20 is depressed which causes the counter to be switched from counting pulses from the fixed transducer to counting pulses from the moving transducer. This is brought about as follows. The negative transfer pulse causes the triode section 30a to become non-conductive while the section 30b of the bistable vacuum tube device becomes conductive. This is merely the reverse of the situation which obtained while the pulses from the fixed transducer were being counted, and the transfer pulse on the grid of the section 30a initiates generally the same sequence of events as occurred when the preset pulse was applied to the grid of the section 30b. However, the output signal taken from the cathode of the cathode follower tube 32 operating in conjunction with the flip-flop section 30a is impressed through the connection 77 impressed on the plate circuits of the diode 78 and on the gate tube 80, the latter of which is in the section 25 of the gate 17. As in the case of the diode 50 and the gate tube 71 in section 26, the voltage applied through the connection 77 tends to raise the plate voltage on the tubes 78 and 80 to the threshold of conductivity against the normally applied bias voltage of −300 volts applied through the voltage divider circuit comprising the resistances 51, 52 and 81. Simultaneously with the enabling of the section 25 of the gate circuit associated with the moving transducer 16, the section 26 associated with the fixed transducer 12 is disabled. This comes about inasmuch as when the section 30a of the bistable vacuum tube device becomes non-conductive the section 30b thereof becomes conductive as is well understood. This in turn causes the cathode follower 31 associated with the section 30b of the bistable device to become non-conductive thus causing a decrease in the cathode voltage. There now being no countering positive voltage applied through the connection 48 to the plate circuit of the diode 50 and the gate tube 71 the plate voltage on the latter two tubes falls to a very low value which renders them inoperative. Thus no signal from the fixed transducer 12 coming in through the input connection 12b can get through the tube 71 to the counter 18. However, the tube 80 having been raised to the threshold of conductivity is now enabled to pass signals applied to its grid. In this case the incoming signals are from the moving transducer 16 and are applied to the input connection 16b. In general these signals are of the same character as those of the fixed transducer since they are generated by the lands 10 on the disc 8 passing the transducer 16 in exactly the same fashion as were the signals generated by the lands 10 on the disc 7 passing the transducer 12. However, the pulses from the transducer 16 may vary somewhat in frequency inasmuch as there is generally some relative movement between the disc 8 and the transducer 16 which is revolved by the shaft 6 under observation. Depending on whether the transducer 16 is being revolved in the same or counter direction as the disc 8, the frequency of the pulses generated will be less than or greater than the frequency of the pulses generated in the fixed transducer as is readily apparent.

These signals from the moving transducer are impressed on the grid of the tuned plate amplifier tube 82 in section 25 operating in conjunction with the tank circuit comprising the capacitance 83 and the inductance 84. This tank circuit is likewise tuned to the frequency of the train of pulses coming in from the moving transducer and the output of this amplifier circuit is also a continuous, relatively pure sine wave of the same frequency as the incoming pulses applied to the grid. This output signal is applied through the coupling capacitance 85 to the grid of the gate tube 80 which is now conductive as previously explained. The positive half cycles of the signal impressed on the grid of the gate tube 80 sets up a pulsating voltage in its cathode circuit which voltage is applied through the coupling capacitance 86 to the control grid 65 of the output gate tube 60. The signal thus applied produces a pulsating output voltage which is applied through the connection 76 to the counter 18 as were the pulses from the fixed transducer 12. However, this output voltage corresponds in frequency to the signal voltage applied to the input connection 16b, each pulse thereof corresponding to a land 10 on the disc 8 passing the moving transducer 16. The counter 18 registers each of these pulses, adding them to the previous total of pulses counted from the fixed transducer.

As was stated in connection with the general description of Fig. 3, the signal generated by the discontinuity 11 in the disc 8 passing the moving transducer 16 is utilized to interrupt the counting of pulses by the counter 18. From this is derived the second control pulse available at the output of the amplifier 46. As was explained, this second control pulse is impressed through the coupling capacitance 47 on the plate of the diode 78 which is now at the threshold of conductivity. On the occurrence of the second control pulse the diode 78 conducts which causes a voltage to be set up across the cathode resistance 87. This voltage is impressed on the grid of the isolation amplifier 88 through the connection 90 thus causing the amplifier 88 to become conductive. This, in turn, causes a decrease in the plate voltage in the connection 91 which also serves to establish the bias on the grid of the triode section 57b of the flip-flop switch. It will be recalled that when the section 57a was caused to become non-conductive so the plate voltage was raised to 300 volts, the plate supply voltage, that this caused the bias on the grid 61 of the output gate tube 60 to rise to a sufficient value to unblock the tube 60. As is well understood when the triode section 57a of the flip-flop device was rendered non-conductive the triode section 57b thereof was simultaneously rendered conductive. Now with the increase in negative bias on the grid of the section 57b that section is rendered non-conductive while the section 57a is simultaneously returned to its conductive state which causes the plate voltage to drop. This reduced positive voltage, applied through the connection 58 and the R-C coupling circuit 59 to the grid 61 of the output gate tube 60, is no longer sufficient to overcome the negative bias applied to the grid 61 through the voltage divider circuit comprising the resistances 62, 63 and 64 and the gate tube 60 is once again blocked so that no more pulses on the grid 65 are passed to the counter.

The counter now registers the sum of the pulses induced in the fixed transducer 12 during the interval between the instant when the discontinuity 11 in the disc 7 passed the fixed transducer and the instant when the transfer pulse occurred plus the number of pulses induced in the moving transducer during the interval between the instant when the transfer pulse occurred and the instant when the discontinuity 11 in the disc 8 passed the moving transducer. The manner in which this sum of pulses registered by the counter is related to the angular position of the shaft 6 under observation will be discussed in detail below.

The entire cycle of operation described above may be repeated periodically or at will merely by introducing another preset pulse. It will be understood that the use of a visually indicating counter 18 is primarily for purposes of illustration of the operation of the circuit and that any other type of pulse counting device may be used. For example, where the position of the shaft is to be indicated at a high repetition rate other means capable of handling the sums and recording them for future use for introducing them into subsequent computing circuits may be used.

The operation of the apparatus is in accordance with the method of the invention. The position of the fixed transducer determines the position of a fiducial radius from which the angular displacements of the reference member and ultimately of the rotating member are measured. The fiducial radius is indicated at 12 in Fig. 4. As previously stated the wide grooves 11 on the discs determine the position of a rotating reference radius as at 23, 23′, 23″ in Fig. 4 and is rotating at some angular speed, $N_1$, in the counterclockwise direction as indicated. The radial position of the moving transducer 16 with respect to the rotating shaft determines a base radius from which the angular displacement of the shaft from the fiducial radius is measured. This base radius is indicated at 24 in Fig. 4 and is, of course, rotating at the speed, $N_2$, of the shaft, the position of which is to be determined. For purposes of illustration the base radius is assumed to be rotating in the same direction as the reference radius.

According to the invention the first step is to measure the displacement of a rotating reference radius with respect to a fixed fiducial radius. The apparatus performs this step in the following manner: at an instant in time, say $T_0$, the wide groove 11 passes the fixed transducer 12 and triggers the counter control circuit 21 to cause the gate 17 to connect the fixed transducer to the counter and to initiate counting of the pulses generated by the fixed transducer. Such counting will continue during a first time interval until, at the instant $T_1$, a pulse from the timed pulse generator 20 or other transfer pulse source causes the switch to disconnect the counter from the fixed transducer and to connect the counter to the moving transducer. At the time of transfer, $T_1$, the grooves 11 in the discs 7 and 8 are dispaced by an angle, $\theta_1$, from the fixed transducer and there is registered in the counter a number, P, of pulses proportional to that angle. In other words, the angular displacement at an instant in time of the reference radius 23' with respect to the fiducial radius 22 has been measured.

The next step of the method is to measure the angular displacement at the same instant in time, $T_1$, of a base reference 24 with respect to the reference radius 23'.

At the instant of transfer, $T_1$, the moving transducer 16 is ahead of the wide groove at the position to be determined. Furthermore, the counter has ceased to count pulses from the fixed transducer and is now counting pulses from the moving transducer. Such counting will continue until the wide groove 11 overtakes and passes the moving transducer at an instant of time, $T_2$, when the counter will be shut off by a pulse from the counter control circuit.

In the interval, $T_1$ to $T_2$, the moving transducer 16 has moved ahead by some angle, $\theta_2$, and the discs 7 and 8 and consequently grooves 11 have been further rotated through an angle, $\theta_3$, greater than $\theta_2$. It is at once apparent that the difference between these angles, $\theta_3-\theta_2$, is the angular displacement, $\theta_4$, of the moving transducer with respect to the wide groove at the instant of transfer. It is also seen that in the interval, $T_1$ to $T_2$, the counter will have added to the number, P, previously registered in the first interval a number, R, of pulses proportional to the magnitude of the angle, $\theta_4$, to obtain a total, $P+R$, related to $\theta_1+\theta_4$. This corresponds to the final step of the method, namely, that the angular displacement of the reference radius from the fiducial radius and the angular displacement of the base radius on the rotating member from the reference radius be summed to determine the angular displacement of the base radius with respect to the fiducial radius.

In operation the apparatus described will continuously repeat the cycle to determine subsequent instantaneous positions of the rotating member. Each such cycle is initiated by the groove 11 passing the fixed transducer which causes the counter to reset to zero and to initiate counting of pulses generated.

In most cases, it is desirable to limit the capacity of the counter to the number of lands in the face of a reference disc, in which case the counter may be made to automatically reset to zero in the event that there has been no transfer pulse from generator 20 or its equivalent. This arrangement will give the actual angular displacement of the moving transducer, and therefore of the shaft under observation, at the instant the transfer pulse occurs. In some applications it may be desirable to have a record of a time interval between some given instant and the instant at which the transfer pulse ocurs. This may be easily accomplished if the counter is adapted to indicate one gross unit for each reset to zero of the land counter. Since the reference disc shaft is being driven at a constant rate, the gross unit total will indicate elapsed time in terms of shaft revolutions prior to the transfer pulse, while the land counter will indicate the instantaneous position of the shaft under observation at the instant the transfer pulse occurs. In either case, there is available in the counter a number which indicates the position of the shaft at the instant of transfer. This number may be easily related to the value of a variable or the value of a function of a variable represented by the position of the shaft and may be plotted against an independent variable or may be used as input data for further computation by a digital computer, for instance.

In some applications where space requirements are not critical it may be found desirable to place the engraved lands parallel to the axis of the discs on the outside or on the inside of the rim of the discs; in such case, the transducers are appropriately mounted adjacent the path of the lands. Where space requirements are stringent, one disc having lands engraved on the opposite faces may be used in lieu of two separate discs. Then the transducers would be mounted adjacent the opposite faces.

As is readily apparent, the grooves 11 in the successions of lands need not have identical displacements about the axis of the discs as in the preferred embodiment, but may be angularly displaced by any amount with respect to each other. This will merely require a correction factor in the counter dependent on the magnitude of the displacement.

A further variation is one in which the grooves 11 are not discontinuities in the succession of lands but are discontinuities in the smooth face of the disc radially inward of the lands or on the rim. It is obvious that such an arrangement would require two additional transducers, one fixed and one moving, but the indicator and its accessories would be the same in all other respects.

It is readily apparent that my shaft position indicator may be adapted to represent the position of the shaft in terms of a function of the displacement rather than of the displacement itself. For example, instead of having the lands equally spaced about the discs to represent units of angular displacement, the lands may have a spacing graduated according to the sine or other function of the angle of the displacement. Moreover, by proper graduation of the spacing of the lands and grooves on the reference disc, the angular displacement may be expressed in any desirable units, such as feet, meters, yards, ounces, pounds, grams, feet per second, miles per hour, gallons per second, etc. In this form my new shaft position indicator functions as a direct data converter.

I claim:

1. Apparatus for indicating the angular position of a rotating member comprising means for generating a first train of distinct signals, the number of signals in said first train being related to the angular displacement during a first time interval of a reference member with respect to a stationary reference point, means for generating a second train of distinct signals, the number of signals in said second train being related to the algebraic sum of the angular displacement of said reference member during a second interval of time continuous of the first interval and the angular displacement during the second interval of the rotating member, and means for recording the sum of the signals generated during the first and second intervals of time.

2. A shaft position indicator comprising a rotatably driven first shaft, first and second metallic discs mounted on said first shaft for rotation therewith, a plurality of radially disposed spaced lands engraved on a face of each of said discs, a stationary first transducer fixed adjacent the engraved face of said first disc and adapted to deliver a pulsating voltage having a frequency determined by the number of lands passing said first transducer in unit time as said first disc rotates, a second shaft adapted to be coupled to a shaft the angular position of which is to be indicated, a crosshead fixed to said second shaft for rotation therewith, a second transducer fixed to said crosshead and adjacent the engraved face of said second disc, said second transducer adapted to deliver a pulsating voltage having a frequency determined by a number of lands passing said second transducer in unit time as said second disc and said second shaft rotate, a pulse counter, and means for selectively connecting said first transducer or said second transducer to said counter, whereby the counter will record the sum of the voltage pulsations delivered by said first and second transducers through said selectively connecting means.

3. A shaft position indicator comprising a counting means adapted to count electrical pulses impressed thereon, a rotatably driven first shaft, a metallic disc mounted on said first shaft for rotation therewith and having a succession of radially disposed spaced lands engraved on each face of said disc and a discontinuity in the succession of lands on each face of said disc, a stationary first magnetic transducer fixed adjacent one face of said disc and adapted to deliver a pulsating voltage having a frequency determined by the number of lands passing said first transducer in unit time as said disc rotates, a second shaft adapted to be coupled to a shaft the angular position of which is to be indicated, a crosshead fixed to said shaft for rotation therewith, a second magnetic transducer fixed to said crosshead adjacent the other face of said disc, said second transducer adapted to deliver a pulsating voltage having a frequency determined by the number of lands passing said second transducer in unit time as said first and second shafts rotate, means for selectively connecting said first transducer or said second transducer to said counter, means to initiate counting of pulses from said first transducer by said counter as said discontinuity in said one face of said disc passes said first transducer, and means to interrupt counting by said counter as said discontinuity in said other face of said disc passes said second transducer, whereby the counter will record the sum of the voltage pulsations delivered by said first and second transducers through said selectively connecting means.

4. A shaft position indicator comprising a counting means adapted to count electrical pulses imposed thereon, a rotatably driven first shaft, first and second metallic discs mounted on said first shaft for rotation therewith, each of said discs having engraved on a face thereof a succession of radially disposed spaced lands and a discontinuity in the succession of lands, the discontinuities in the faces of said discs having the same angular orientation about the axis of said first shaft, a stationary first magnetic transducer fixed adjacent the engraved face of said first disc and adapted to deliver a pulsating voltage having a frequency determined by the number of lands passing said first transducer in unit time as said first disc rotates, a second shaft adapted to be coupled to a shaft the angular position of which is to be indicated, a second magnetic transducer fixed to said second shaft adjacent the engraved face of said second disc for revolution about the axis of said first shaft, said second transducer adapted to deliver a pulsating voltage having a frequency determined by the number of lands passing said second transducer as said first and second shafts rotate, means to initiate counting of pulses from said first transducer by said counter as said discontinuity in the face of said first disc passes said first transducer, means for disconnecting said first transducer from said counter and connecting thereto said second transducer at the instant the position of the shaft under observation is to be indicated, and means to interrupt counting of pulses from said second transducer as said discontinuity in the face of said second disc passes said second transducer.

5. A shaft position indicator comprising a counting means adapted to count electrical pulses imposed thereon, a rotatably driven first shaft, first and second metallic discs mounted on said first shaft for rotation therewith, each of said discs having engraved on a face thereof a succession of radially disposed spaced lands, each of said discs having a discontinuity in a surface thereof, a stationary first fixed magnetic transducer positioned adjacent the engraved face of said first disc and adapted to deliver a pulsating voltage having a frequency determined by the number of lands passing said first transducer in unit time as said first disc rotates, a stationary second fixed magnetic transducer positioned adjacent the path of said discontinuity in the face of said first disc and adapted to deliver a voltage pulse at the instant the discontinuity in a surface of said first disc is immediately adjacent thereto, a second shaft adapted to be coupled to a shaft the angular position of which is to be indicated, a first moving magnetic transducer fixed to said second shaft adjacent the engraved face of said second disc for revolution about the axis of said first shaft, said first moving transducer adapted to deliver a pulsating voltage having a frequency determined by the number of lands passing said first moving transducer as said first and second shafts rotate, a second moving transducer fixed to said second shaft adjacent the path of said discontinuity in the surface of said second disc and adapted to deliver a voltage pulse at the instant the discontinuity in a surface of said second disc is immediately adjacent thereto, means to initiate counting of pulses from said first fixed transducer by said counter as said discontinuity in the surface of said first disc passes said second fixed transducer, means for disconnecting said first fixed transducer from said counter and connecting thereto said first moving transducer at the instant the position of the shaft under observation is to be indicated, and means to interrupt counting of pulses from said first moving transducer as said discontinuity in the face of said second disc passes said second moving transducer.

6. Apparatus for determining the angular position of a rotating member, which apparatus comprises means providing a base mark moving in coincidence with the rotating member the position of which is to be determined, means providing a stationary fiducial mark, means providing a rotating reference mark, means for measuring the angular displacement of the rotating reference mark with respect to the fiducial mark at the instant the position of the rotating member is to be determined, means for measuring the angular displacement of the reference mark with respect to the base mark occurring in the interval commencing at the instant the position of the rotating member is to be determined and ending at an instant when the base mark and the reference mark have the same position with respect to the fiducial mark, and means for adding algebraically the angular displacements so measured.

7. Apparatus for determining the instantaneous angular position of a rotating member, which apparatus comprises means providing a stationary fiducial mark, means providing a base mark moving in coincidence with the rotating member the position of which is to be determined, means providing a rotating reference mark, means for generating a distince signal for each unit of angular displacement of the reference mark and for recording the number of such signals occurring in a first interval of time commencing at an instant when the reference mark passes the fiducial mark and ending at the instant when the position of the rotating member is to be determined, means for generating a distinct signal for each unit of angular displacement of the reference mark with respect to the base mark moving in coincidence with the rotating member and for recording the number of such signals occurring in a second interval of time commencing at the instant the position of the rotating member is to be determined and ending at the instant that the reference mark passes the base mark and means for summing the numbers of signals recorded in the first and second intervals.

8. Apparatus for determining the instantaneous angular position of a rotating member, which apparatus comprises means providing a stationary fiducial mark, means providing a base mark moving in coincidence with the rotating member the position of which is to be determined, means providing a rotating reference mark, means for generating a first train of distinct signals, each signal in said first train being representative of a unit of angular displacement of the reference mark with respect to the fiducial mark, means for generating a second train of distinct signals, each signal of said second train being representative of a unit of angular displacement of the base mark with respect to the reference mark, and means for algebraically adding the signals in the first train which occur during an interval commencing with the instant the reference mark passes the fiducial mark and ending at the instant the position of the rotating member is to be determined plus the number of signals in the second train occurring during an interval commencing at the instant the position of the rotating member is to be determined and ending at an instant when the reference mark passes the base mark on the rotating member.

References Cited in the file of this patent

UNITED STATES PATENTS

| | | |
|---|---|---|
| 2,575,342 | Gridley | Nov. 20, 1951 |
| 2,597,866 | Gridley | May 27, 1952 |
| 2,672,284 | Dickinson | Mar. 16, 1954 |
| 2,680,241 | Gridley | June 1, 1954 |
| 2,685,082 | Beman et al. | July 27, 1954 |
| 2,730,698 | Daniels et al. | Jan. 10, 1956 |
| 2,734,188 | Jacobs | Feb. 7, 1956 |
| 2,747,797 | Beaumont | May 29, 1056 |
| 2,765,459 | Winter | Oct. 2, 1956 |

OTHER REFERENCES

A. J. Winter: A Magnetically Coupled Low-Cost High-Speed Shaft Position Digitizer, Proceeding of the Western Computer Conference, Feb. 4–6, 1953, pages 203–207 only relied on.

Survey of Analog-to-Digital Converters, H. E. Burke, AIEE Special Publication S–53, March 1953, pages 98–105 only.

Lund-ERA Shaft-Position Analog-to-Digital Converter, Transactions of the I.R.E. Professional Group on Instrumentation, June 1953, pages 55 to 60, page 59 relied upon.